(12) United States Patent
Suzuki et al.

(10) Patent No.: US 10,312,548 B2
(45) Date of Patent: Jun. 4, 2019

(54) BATTERY AND BATTERY MANUFACTURING METHOD

(71) Applicant: TOYOTA JIDOSHA KABUSHIKI KAISHA, Toyota-shi, Aichi-ken (JP)

(72) Inventors: Satoshi Suzuki, Toyota (JP); Junta Takasu, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 262 days.

(21) Appl. No.: 15/316,320

(22) PCT Filed: Jun. 9, 2015

(86) PCT No.: PCT/IB2015/000889
§ 371 (c)(1),
(2) Date: Dec. 5, 2016

(87) PCT Pub. No.: WO2015/189677
PCT Pub. Date: Dec. 17, 2015

(65) Prior Publication Data
US 2017/0179533 A1  Jun. 22, 2017

(30) Foreign Application Priority Data
Jun. 10, 2014 (JP) .................................. 2014-119777

(51) Int. Cl.
*H01M 10/0587* (2010.01)
*H01M 10/0525* (2010.01)
(Continued)

(52) U.S. Cl.
CPC ......... *H01M 10/0587* (2013.01); *H01M 2/02* (2013.01); *H01M 2/0237* (2013.01);
(Continued)

(58) Field of Classification Search
CPC ............ H01M 10/04; H01M 10/0413; H01M 10/0525; H01M 10/0587; H01M 2/02;
(Continued)

(56) References Cited

U.S. PATENT DOCUMENTS 9,799,874 B2 * 10/2017 Han ...................... H01M 2/263
2010/0203371 A1   8/2010 Nagai et al.
(Continued)

FOREIGN PATENT DOCUMENTS

JP   2009-026705 A   2/2009
JP   2010-129450 A   6/2010
(Continued)

*Primary Examiner* — Carlos Barcena
(74) *Attorney, Agent, or Firm* — Sughrue Mion, PLLC

(57) ABSTRACT

A battery includes: a battery outer case; an electrode body; and a terminal. The case main body includes a bottomed case main body which has a flat accommodation space and of which one surface is opened, and a sealing plate attached to that one surface of the case main body which is opened. The electrode body is a flat electrode body, is accommodated in the flat accommodation space of the case main body, and has a part to which the terminal is joined. The terminal includes a base end attached to the sealing plate, an intermediate part extending from the base end toward the part to which the terminal is joined, along a surface on one side of the battery outer case, and a tip end joined to the part to which the terminal is joined. The tip end of the terminal is joined to a surface on one side of the part to which the terminal is joined, and pushes the part to which the terminal is joined.

8 Claims, 9 Drawing Sheets

(51) Int. Cl.
  *H01M 10/04* (2006.01)
  *H01M 2/26* (2006.01)
  *H01M 2/02* (2006.01)
  *H01M 2/22* (2006.01)
  *H01M 2/06* (2006.01)

(52) U.S. Cl.
  CPC .............. *H01M 2/06* (2013.01); *H01M 2/22* (2013.01); *H01M 2/26* (2013.01); *H01M 2/263* (2013.01); *H01M 10/04* (2013.01); *H01M 10/0413* (2013.01); *H01M 10/0525* (2013.01); *Y02T 10/7011* (2013.01)

(58) Field of Classification Search
  CPC ........ H01M 2/0237; H01M 2/06; H01M 2/22; H01M 2/26; H01M 2/263

See application file for complete search history.

(56) References Cited

U.S. PATENT DOCUMENTS

| | | | |
|---|---|---|---|
| 2011/0171516 A1* | 7/2011 | Byun | H01M 2/263 429/161 |
| 2013/0157094 A1 | 6/2013 | Saimaru et al. | |
| 2013/0209888 A1* | 8/2013 | Nagai | H01M 4/131 429/231.1 |
| 2013/0252053 A1* | 9/2013 | Woo | H01M 2/26 429/94 |
| 2013/0273411 A1* | 10/2013 | Kim | H01M 2/30 429/158 |
| 2014/0212718 A1 | 7/2014 | Yokoyama et al. | |
| 2015/0207136 A1 | 7/2015 | Harayama et al. | |

FOREIGN PATENT DOCUMENTS

| | | |
|---|---|---|
| JP | 2011-103249 A | 5/2011 |
| JP | 2011-165436 A | 8/2011 |
| JP | 2012-248359 A | 12/2012 |
| JP | 2014-032936 A | 2/2014 |
| WO | 2013/031668 A1 | 3/2013 |
| WO | 2014/024522 A1 | 2/2014 |

* cited by examiner

BATTERY AND BATTERY MANUFACTURING METHOD

BACKGROUND OF THE INVENTION

1. Field of the Invention

The present invention relates to a battery and a battery manufacturing method, which is applied to a lithium-ion secondary battery as one type of a nonaqueous electrolyte secondary battery, for example. A "secondary battery" in the present specification indicates a general battery that is chargeable and dischargeable repeatedly. A "nonaqueous electrolyte secondary battery" indicates a secondary battery that uses a nonaqueous electrolyte made of a nonaqueous solvent in which an electrolyte salt is dissolved. A "lithium-ion secondary battery" indicates a secondary battery that uses lithium ions as electrolyte ions and performs charging and discharging by migration of electric charges along with lithium ions between positive and negative electrodes.

2. Description of Related Art

Japanese Patent Application Publication No. 2010-129450 (JP 2010-129450 A) describes a battery in which a wound electrode body (also referred to as the "electrode body" appropriately) is welded, by resistance welding, to tip ends of electrode terminals attached to a sealing plate of a battery outer case. Herein, the electrode terminal (also referred to as the "terminal" appropriately) extends from a part where the electrode terminal is attached to the sealing plate along a part between the electrode body and the battery outer case. The tip end of the terminal is bent toward that part of the electrode body in which a current collector foil (a metal foil) is exposed, and is welded to that part of the electrode body in which the current collector foil (the metal foil) is exposed. Further, for example, Japanese Patent Application Publication No. 2011-103249 (JP 2011-103249 A) proposes that an elastic member is placed between an electrode body and a battery outer case so as to improve an impact resistance and a vibration resistance.

For example, a lithium-ion secondary battery can achieve a high capacity and a high output, so that the lithium-ion secondary battery can be provided in a vehicle so as to be used as a driving power supply. Such an in-vehicle battery receives running vibration. At this time, vibration is repeatedly applied to a joining portion between the terminal and the electrode body. Accordingly, in such a battery, it is preferable for the joining portion between the terminal and the electrode body to have a higher reliability. In view of this, the reliability of the joining portion between the terminal and the electrode body is desired to be improved.

SUMMARY OF THE INVENTION

A first aspect of the present invention relates to a battery. The battery includes a battery outer case, an electrode body, and a terminal. The case main body includes a bottomed case main body which has a flat accommodation space and of which one surface is opened, and a sealing plate attached to that one surface of the case main body which is opened. The electrode body is a flat electrode body, is accommodated in the flat accommodation space of the case main body, and has a part to which the terminal is joined. The terminal includes a base end, an intermediate part, and a tip end. The base end is attached to the sealing plate. The intermediate part extends from the base end toward the part to which the terminal is joined, along a surface on one side of the battery outer case. The tip end is joined to the part to which the terminal is joined. Here, the tip end of the terminal is joined to a surface on one side of the part to which the terminal is joined, and pushes the part to which the terminal is joined. In this case, a force acts in a direction where the tip end of the terminal makes close contact with an intermediate part of the electrode body. This makes it possible to provide a battery in which a tip end of a terminal is hard to be removed from an intermediate part of an electrode body at their joining portion, and the joining portion between the terminal and the wound electrode body is highly reliable.

Here, the tip end of the terminal is joined to the surface on the one side of the part to which the terminal is joined, and in a state where an outer surface of the battery outer case is not constrained, that surface of the electrode body which is on an opposite side to a side where the tip end of the terminal is joined is pushed against the battery outer case more strongly than that surface of the electrode body which is on the side where the tip end of the terminal is joined.

Further, the base end of the terminal may be attached to the sealing plate. The attaching position of the sealing plate is biased toward the side where the tip end of the terminal is joined. Further, the intermediate part of the terminal may have a first linear part extending along the surface on the one side of the battery outer case, and a second linear part bent from a tip of the first linear part. Further, the tip end of the terminal may be bent from a tip of the second linear part, and may have a flat shape having a thinner plate-thickness than that of the first linear part, and in a natural state where the electrode body is removed from the terminal, the tip end may be inclined toward a side where the electrode body is attached.

In this case, a boundary between the second linear part and the tip end may have a base point at which the tip end is elastically bent relative to the second linear part. For example, the second linear part may be gradually reduced in plate thickness from the tip of the first linear part toward the tip end. Further, a thickness of the boundary between the second linear part and the tip end may be thinner than the other parts of the second linear part and the tip end, for example. Further, the base end and the first linear part of the terminal may have rigidity higher than that of the tip end of the terminal.

Further, for example, when an assembly in which the sealing plate, the terminal, and the electrode body are assembled is taken out from the case main body, that side of the electrode body which is far from the sealing plate may be inclined relative to a normal line direction of the sealing plate, toward an opposite side to the side where the tip end of the terminal is joined.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of a battery proposed herein is described below. Naturally, the embodiment described herein is not intended to limit the present invention in particular. Further, each drawing is illustrated schematically, and a dimensional relationship (length, width, thickness, and the like) in each drawing does not show an actual dimensional relationship, for example. Further, the same reference sign is assigned to members/parts that yield the same effect, and a redundant description is omitted or simplified appropriately.

The following describes the battery proposed herein by taking a lithium-ion secondary battery as an example.

<<Lithium-Ion Secondary Battery 10>>

Figure 1:
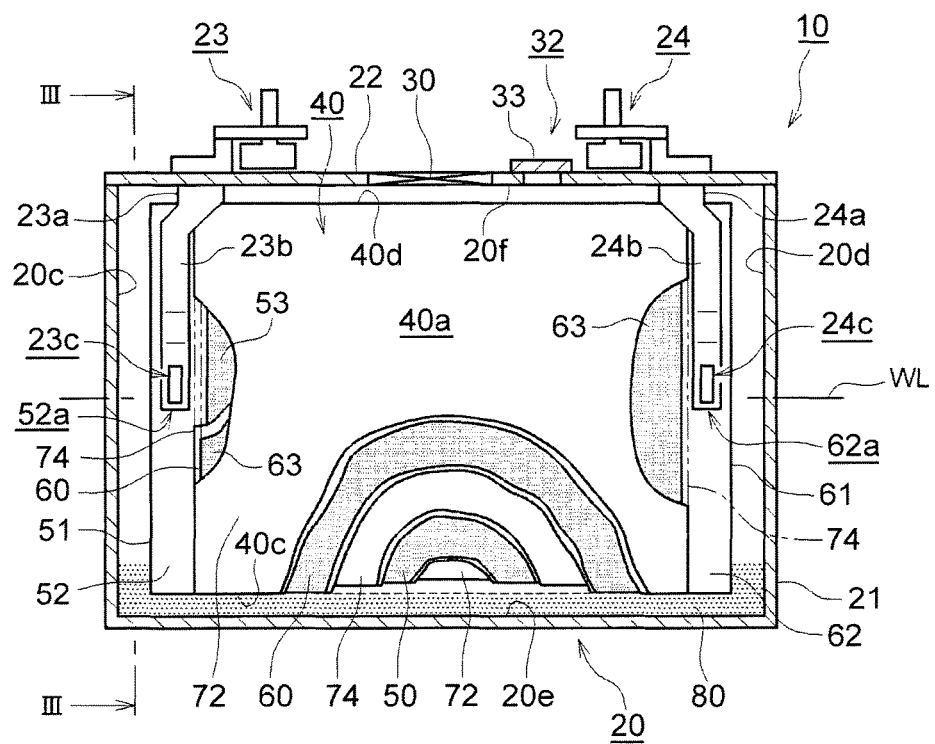
FIG. 1 is a sectional view illustrating a lithium-ion secondary battery 10.
Figure 2:
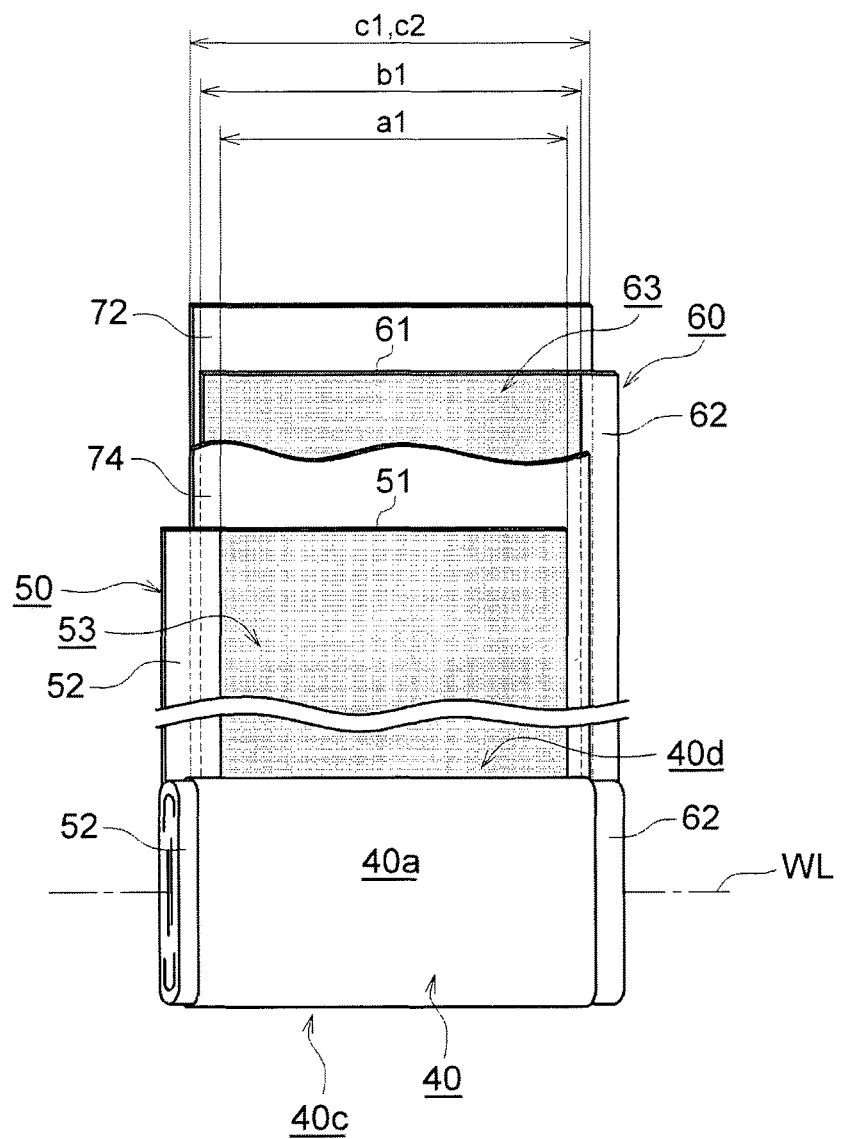
FIG. 2 is a view illustrating an electrode body 40 provided in the lithium-ion secondary battery 10.
Figure 3:
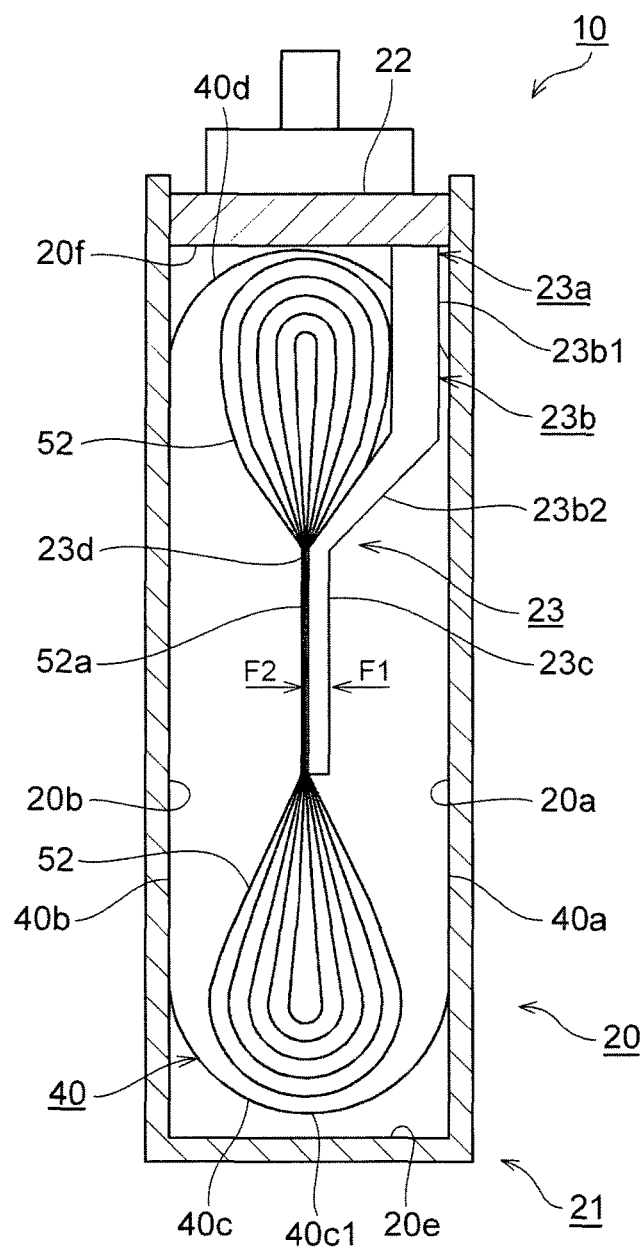
FIG. 3 is a sectional view illustrating a side surface on an exposed-part-52 side of a positive electrode.

FIG. 1 is a sectional view illustrating a lithium-ion secondary battery 10. FIG. 2 is a view illustrating an electrode body 40 provided in a battery outer case 20 of the lithium-ion secondary battery 10. FIG. 3 is a sectional view taken along arrows of FIG. 1 (a sectional view illustrating a side surface on an exposed-part-52 side of a positive electrode). Note that the lithium-ion secondary battery 10 illustrated in FIGS. 1 to 3 is merely one example of a lithium-ion secondary battery to which the present invention is applicable, and does not limit the lithium-ion secondary battery to which the present invention is applicable, in particular.

As illustrated in FIG. 1, the lithium-ion secondary battery 10 includes a battery outer case 20, an electrode body 40 (a wound electrode body in FIG. 1), and terminals 23, 24. Here, the lithium-ion secondary battery 10 including a flat wound electrode body 40 as the electrode body 40 is exemplified.

<<Battery Outer Case 20>>

The battery outer case 20 includes a case main body 21 and a sealing plate 22. The case main body 21 is a bottomed case which has a flat accommodation space and of which one surface is opened. Herein, a rectangular opening is formed in the case main body 21. The sealing plate 22 is a member that is attached to that one surface of the case main body 21 which is opened, so as to close an opening of the case main body 21. The sealing plate 22 is made of a generally rectangular plate. In the present embodiment, the case main body 21 has a flat and generally rectangular-solid-shaped accommodation space, and when the sealing plate 22 is welded to a peripheral edge of the opening of the case main body 21, the battery outer case 20 is formed to have a generally hexahedral shape.

In an example illustrated in FIG. 1, the positive terminal 23 and the negative terminal 24 for external connections are attached to the sealing plate 22. A relief valve 30 and an injection opening 32 are formed in the sealing plate 22. The relief valve 30 is configured to relieve an internal pressure of the battery outer case 20 when the internal pressure increases to a predetermined level (e.g., a setting valve opening pressure of about 0.3 MPa to 1.0 MPa) or more. Further, FIG. 1 illustrates a state where the injection opening 32 is sealed by a sealing material 33 after an electrolyte 80 is injected. The electrode body 40 is accommodated in the battery outer case 20.

<<Electrode Body 40 (Wound Electrode Body)>>

As illustrated in FIG. 2, the electrode body 40 includes a belt-shaped positive electrode (a positive-electrode sheet 50), a belt-shaped negative electrode (a negative-electrode sheet 60), and belt-shaped separators (separators 72, 74).

<<Positive-Electrode Sheet 50>>

The positive-electrode sheet 50 includes a belt-shaped positive-electrode current collector foil 51 and a positive-electrode active material layer 53. A metal foil suitable for a positive electrode can be preferably used as the positive-electrode current collector foil 51. A belt-shaped aluminum foil having a predetermined width and a thickness of about 15 μm can be used as the positive-electrode current collector foil 51, for example. An exposed part 52 is set along an edge of the positive-electrode current collector foil 51 on one side thereof in a width direction. In an example illustrated herein, the positive-electrode active material layer 53 is formed on either side of the positive-electrode current collector foil 51 except for the exposed part 52 set in the positive-electrode current collector foil 51. Here, the positive-electrode active material layer 53 is held by the positive-electrode current collector foil 51, and includes at least a positive-electrode active material. In the present embodiment, the positive-electrode active material layer 53 is configured such that a positive-electrode mixture including the positive-electrode active material is applied to the positive-electrode current collector foil 51. Further, the "exposed part 52" indicates a part where the positive-electrode active material layer 53 is not held (applied, formed) on the positive-electrode current collector foil 51.

As the positive-electrode active material, it is possible to use one or more substances conventionally used for a lithium-ion secondary battery without any particular limit. Preferable examples thereof include: oxides (lithium transition metal oxides) containing lithium and a transition metal element as a constituent metal element, such as lithium nickel oxide (e.g., $LiNiO_2$), lithium cobalt oxide (e.g., $LiCoO_2$), and lithium manganese oxide (e.g., $LiMn_2O_4$); and phosphates containing lithium and a transition metal element as a constituent metal element, such as manganese phosphate lithium ($LiMnPO_4$) and lithium iron phosphate ($LiFePO_4$).

<<Negative-Electrode Sheet 60>>

As illustrated in FIG. 2, the negative-electrode sheet 60 includes a belt-shaped negative-electrode current collector foil 61 and a negative-electrode active material layer 63. A metal foil suitable for a negative electrode can be preferably used as the negative-electrode current collector foil 61. A belt-shaped copper foil having a predetermined width and a thickness of about 10 μm is used as the negative-electrode current collector foil 61. An exposed part 62 is set along an edge of the negative-electrode current collector foil 61 on one side thereof in a width direction. The negative-electrode active material layer 63 is formed on either side of the negative-electrode current collector foil 61 except for the exposed part 62 set in the negative-electrode current collector foil 61. The negative-electrode active material layer 63 is held by the negative-electrode current collector foil 61, and includes at least a negative-electrode active material. In the present embodiment, the negative-electrode active material layer 63 is configured such that a negative-electrode mixture including the negative-electrode active material is applied to the negative-electrode current collector foil 61. Further, the "exposed part 62" indicates a part where the negative-electrode active material layer 63 is not held (applied, formed) on the negative-electrode current collector foil 61.

<Negative-Electrode Active Material>

As the negative-electrode active material, it is possible to use one or more substances conventionally used for a lithium-ion secondary battery without any particular limit. Preferable examples thereof include carbon materials such as graphite carbon and amorphous carbon, lithium transition metal oxides, lithium transition metal nitrides, and the like. The positive-electrode active material layer 53 and the negative-electrode active material layer 63 include a conductive material and a binder as appropriate.

<Conductive Material>

The conductive material is a material that is included to improve conductivity of the positive-electrode active material layer 53 and the negative-electrode active material layer 63. Examples of the conductive material include carbon materials such as carbon powder and carbon fiber, for example. One selected from such conductive materials may be used solely, or two or more thereof may be used in combination. Examples of the carbon powder usable herein include powders of acetylene black, oil furnace black, carbon black, graphitized carbon black, black lead, Ketjen black, graphite, and so on.

<Binder>

The binder is a material that causes respective particulates of the positive-electrode active material and the conductive material included in the positive-electrode active material 53 to be bound to each other, or causes these particulates to be bound to the positive-electrode current collector foil 51. Examples of the binder include: cellulose polymers (carboxymethyl cellulose (CMC), hydroxypropyl methylcellulose (HPMC), and the like); fluorinated resins (e.g., polytetrafluoroethylene (PTFE), tetrafluoroethylene-hexafluoropropylene copolymer (FEP), and the like); and rubbers (styrene-butadiene copolymer (SBR), acrylic acid modified SBR resin (SBR latex)); polyvinyl alcohol (PVA); acetic acid vinyl copolymer; polyvinylidene fluoride (PVDF); polyvinylidene chloride (PVDC); polyacrylonitrile (PAN); and the like polymers. Among them, cellulosic polymers are also used as a thickener at the time when a pasty or slurry mixture is formed.

<<Separators 72, 74>>

As illustrated in FIG. 2, the separators 72, 74 are members that separate the positive-electrode sheet 50 from the negative-electrode sheet 60. In the present embodiment, the separators 72, 74 are each constituted by a belt-shaped sheet material having a predetermined width and having a plurality of minute pores. As the separators 72, 74, a monolayer-structure separator or a laminated-structure separator each made from a porous film made of resin, e.g., porous polyolefin resin is used. In the present embodiment, as illustrated in FIG. 2, a width b1 of the negative-electrode active material layer 63 is slightly larger than a width a1 of the positive-electrode active material layer 53. Further, widths c1, c2 of the separators 72, 74 are slightly larger than the width b1 of the negative-electrode active material layer 63 (c1, c2>b1>a1).

<<Structure of Electrode Body 40 (Wound Electrode Body)>>

Herein, the electrode body 40 is a wound electrode body configured such that a plurality of sheets is wound so as to be flat along one plane surface including a winding shaft WL. More specifically, as illustrated in FIG. 2, the wound electrode body 40 is configured such that the positive-electrode sheet 50, the negative-electrode sheet 60, and the separators 72, 74 are laminated in a predetermined order and wound. Here, the exposed part 52 of the positive-electrode sheet 50 protrudes from one side of the separators 72, 74 in the width direction. The exposed part 62 of the negative-electrode sheet 60 protrudes from an opposite side of the separators 72, 74 in the width direction. Further, the wound electrode body 40 has a shape bent flatly by pushing along one plane surface including the winding shaft WL, as illustrated in FIG. 2. Further, the wound electrode body 40 is accommodated in a flat accommodation space of the battery outer case 20.

<<Each Side Surface of Battery Outer Case 20>>

In the present embodiment, the battery outer case 20 has a flat rectangular-solid-shaped accommodation space, and has six surfaces opposed to the wound electrode body 40 to be accommodated therein. The battery outer case 20 includes a pair of opposed wide surfaces 20a, 20b (see FIG. 3) respectively facing flat wide surfaces 40a, 40b of the wound electrode body 40.

Further, the battery outer case 20 includes a pair of opposed side surfaces 20c, 20d on both sides of the winding shaft WL of the wound electrode body 40. The pair of opposed side surfaces 20c, 20d face both side surfaces of the wound electrode body 40 in a direction of the winding shaft WL. Here, edges of the exposed part 52 of the positive-electrode sheet 50 and the exposed part 62 of the negative-electrode sheet 60 are exposed on both side surfaces of the wound electrode body 40 which face the pair of opposed side surfaces 20c, 20d. The edges of the exposed part 52 of the positive-electrode sheet 50 and the exposed part 62 of the negative-electrode sheet 60 are each continued in a flat spiral shape (see FIG. 2). Intermediate parts 52a, 62a of the exposed parts 52, 62 are each united (see FIG. 3). In other words, the intermediate part 52a of the exposed part 52 and the intermediate part 62a of the exposed part 62 are each bundled up so that each of the sheets makes close contact with each other. The intermediate parts 52a, 62a of the exposed parts 52, 62 serve as parts to which the terminals 23, 24 are joined.

Further, the battery outer case 20 includes a bottom face 20e facing an R part 40c at which each of the sheets is curved at a bottom of the wound electrode body 40. Further, a top face (in other words, a ceiling surface) of the case main body 21 of the battery outer case 20, which is opposed to the bottom face 20e, is opened. The sealing plate 22 is mounted to the opening of the case main body 21. An inner surface of the sealing plate 22 is opposed to an upper R part 40d of the wound electrode body 40, as a top face 20f of the battery outer case 20. The wound electrode body 40 accommodated in the battery outer case 20 is placed at a predetermined position inside the battery outer case 20 by the positive terminal 23 and the negative terminal 24.

<<Electrolyte (Liquid Electrolyte)>>

The lithium-ion secondary battery 10 is configured such that, after the wound electrode body 40 is accommodated in the battery outer case 20, an electrolyte 80 is poured therein. As the electrolyte 80, it is possible to use a nonaqueous electrolyte conventionally used for a lithium-ion secondary battery without any particular limit. One example of the nonaqueous electrolyte is a nonaqueous electrolyte obtained by adding $LiPF_6$ to a mixed solvent of ethylene carbonate with diethyl carbonate (with a volume ratio of 1:1, for example) so that a concentration of $LiPF_6$ is approximately 1 mol/L.

<<Terminals (Positive Terminal 23, Negative Terminal 24)>>

The terminals 23, 24 are attached to the sealing plate 22, and extend inside the battery outer case 20 so as to be connected to the electrode body 40. Base ends 23a, 24a of the terminals 23, 24 are attached to the sealing plate 22. In the present embodiment, intermediate parts 23b, 24b of the terminals 23, 24 extend from the base ends 23a, 24a along the surface 20a on one side of the battery outer case 20, between one wide surface 40a of the electrode body 40 and a wide surface (the surface 20a on one side) of the battery outer case 20. The intermediate parts 23b, 24b of the terminals 23, 24 extend along the exposed part 52 of the positive-electrode sheet 50 and the exposed part 62 of the negative-electrode sheet 60, respectively, and reach an intermediate part of the electrode body 40 (herein, the intermediate parts 52a, 62a of the exposed part 52 of the positive-electrode sheet 50 and the exposed part 62 of the negative-electrode sheet 60). Tip ends 23c, 24c of the terminals 23, 24 are joined to the intermediate parts 52a, 62a of the exposed parts 52, 62. Here, the intermediate parts 23b, 24b of the terminals 23, 24 extend along the surface 20a on the one side of the battery outer case 20, between the one wide surface 40a of the electrode body 40 and the wide surface (the surface 20a on one side) of the battery outer case 20. The tip ends 23c, 24c of the terminals 23, 24 are joined to respective surfaces of the intermediate parts 52a, 62a of the exposed parts 52, 62 which face the surface 20a on the one side of the battery outer case 20. In the present embodiment, the tip ends 23c, 24c of the terminals 23, 24 are joined to the intermediate parts 52a, 62a of the exposed parts 52, 62 by laser welding or resistance welding, for example.

Further, in the present embodiment, the tip ends 23c, 24c of the terminals 23, 24 are joined to surfaces on one sides of the intermediate parts 52a, 62a of the electrode body 40, so as to push those intermediate parts 52a, 62a of the electrode body 40 to which the tip ends 23c, 24c of the terminals 23, 24 are joined. That is, the tip ends 23c, 24c of the terminals 23, 24 apply a force F1 to the intermediate parts 52a, 62a of the electrode body 40, so that the intermediate parts 52a, 62a of the electrode body 40 are pushed from a side where the tip ends 23c, 24c are attached. Further, an outer surface of the electrode body 40 makes contact with an inner surface of the battery outer case 20, so that the tip ends 23c, 24c of the terminals 23, 24 receive a reaction force F2 from the intermediate parts 52a, 62a of the electrode body 40. Thus, the forces F1, F2 work to cause the tip ends 23c, 24c to make close contact with the intermediate part 52a, 62a. Because of this, at the time when the battery is provided in an automobile, for example, the battery receives running vibration. Even if the battery receives such vibration, the tip ends 23c, 24c are maintained to make close contact with the intermediate part 52a, 62a due to the forces F1, F2. Accordingly, the tip ends 23c, 24c are hard to be removed from the intermediate parts 52a, 62a, so that joining portions between the terminals 23, 24 and the electrode body 40 are highly reliable.

Figure 4:
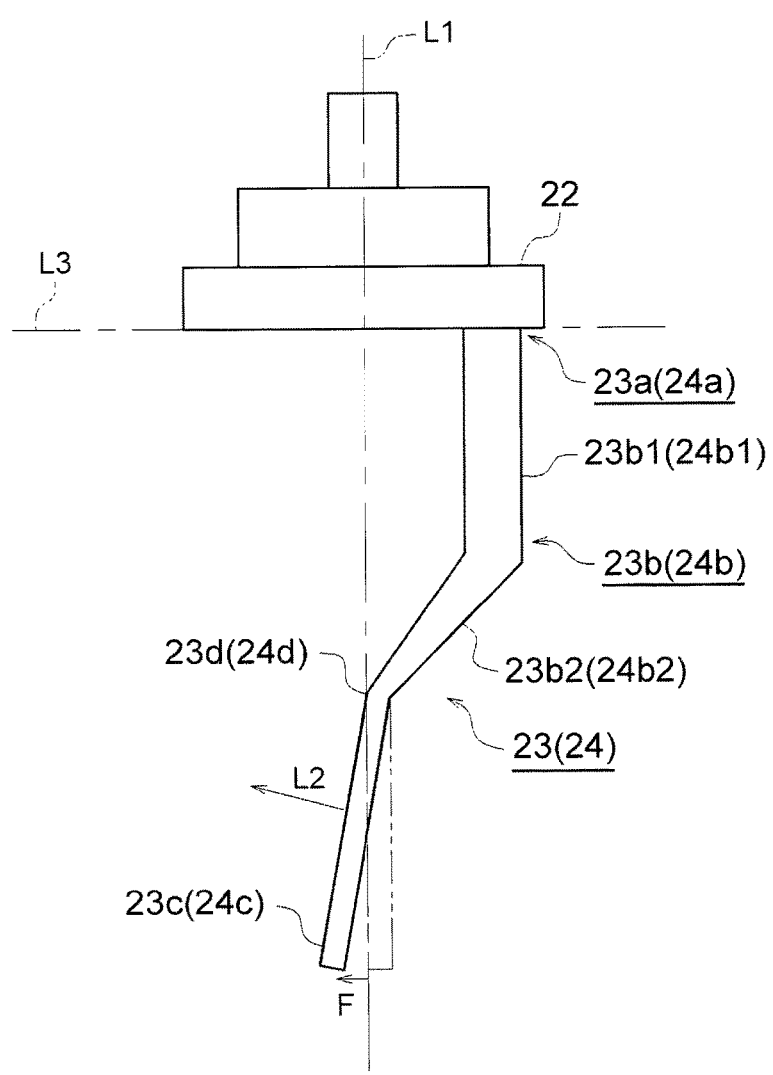
FIG. 4 is a side view of a terminal 23 exemplified herein.

Here, an alternate long and short dash line in FIG. 4 indicates a center line of the side surface of the battery outer case 20 in the width direction in a state where the electrode body 40 is accommodated in the battery outer case 20. Note that, in FIG. 3, the side surface on the exposed-part-52 side of the positive electrode of the electrode body 40 in the battery outer case 20 is illustrated. A side view on an exposed-part-62 side of the negative electrode is omitted, but can be understood based on FIG. 3, and the side view on the exposed-part-62 side is a view obtained by reversing right and left of FIG. 3.

<<Structural Example of Terminals 23, 24>>

Herein, one example of the terminals 23, 24 is described. FIG. 4 illustrates the terminal 23 exemplified herein. Note that the terminal 24 can be understood based on FIG. 4. A reference sign of a corresponding part of the terminal 24 is described in parenthesis in FIG. 4. FIG. 4 illustrates a state in which the terminals 23, 24 are attached to the sealing plate 22, but the electrode body 40 has not been attached yet. Further, an alternate long and short dash line L1 in FIG. 4 indicates a center line of the side surface of the battery outer case 20 in the width direction in a state where the electrode body 40 is attached to the terminals 23, 24 and accommodated in the battery outer case 20. Further, an alternate long and two short dashes line in FIG. 4 indicates a state where the tip ends 23c, 24c of the terminals 23, 24 are deformed when the electrode body 40 is attached to the terminals 23, 24 and accommodated in the battery outer case 20.

As illustrated in FIGS. 3 and 4, the base ends 23a, 24a of the terminals 23, 24 are attached to the sealing plate 22. The attaching position of the sealing plate is biased toward a side where the tip ends 23c, 24c of the terminals 23, 24 are joined. That is, as illustrated in FIG. 3, the tip ends 23c, 24c of the terminals 23, 24 are joined to one sides of the intermediate parts 52a, 62a of the electrode body 40. In the meantime, the base ends 23a, 24a of the terminals 23, 24 are attached to the sealing plate 22. The attaching positions are biased toward the side where the tip ends 23c, 24c of the terminals 23, 24 are attached to the electrode body 40, in the width direction of the side surface of the battery outer case 20.

Further, the intermediate parts 23b, 24b of the terminals 23, 24 include first linear parts 23b1, 24b1 and second linear parts 23b2, 24b2. Here, the first linear parts 23b1, 24b1 extend along the surface 20a on the one side of the battery outer case 20. In the present embodiment, the first linear part 23b1 extends along a gap between the exposed part 52 of the electrode body 40 and the surface 20a of the battery outer case 20. Although not illustrated herein, the first linear part 24b1 extends along a gap between the exposed part 62 of the electrode body 40 and the surface 20a of the battery outer case 20.

The second linear parts 23b2, 24b2 of the terminals 23, 24 are bent from tips of the first linear parts 23b1, 24b1. Further, the tip ends 23c, 24c of the terminals 23, 24 are bent from tips of the second linear parts 23b2, 24b2, and have a flat shape having a thinner plate-thickness than that of the first linear parts 23b1, 24b1. Further, in a natural state in which the electrode body 40 is removed from the terminals 23, 24, the tip ends 23c, 24c of the terminals 23, 24 are inclined toward a side (a direction of an arrow F in FIG. 4) on which the electrode body 40 is attached, as illustrated in FIG. 4. More specifically, the tip ends 23c, 24c of the terminals 23, 24 are inclined toward the direction of the arrow F in FIG. 4 (the side on which the electrode body 40 is attached to the tip ends 23c, 24c), relative to the center line L1 of the side surface of the battery outer case 20 in the width direction at the time when the electrode body 40 is accommodated in the battery outer case 20. Herein, angles to bend boundaries 23d, 24d between the second linear parts 23b2, 24b2 and the tip ends 23c, 24c are adjusted.

Figure 5:
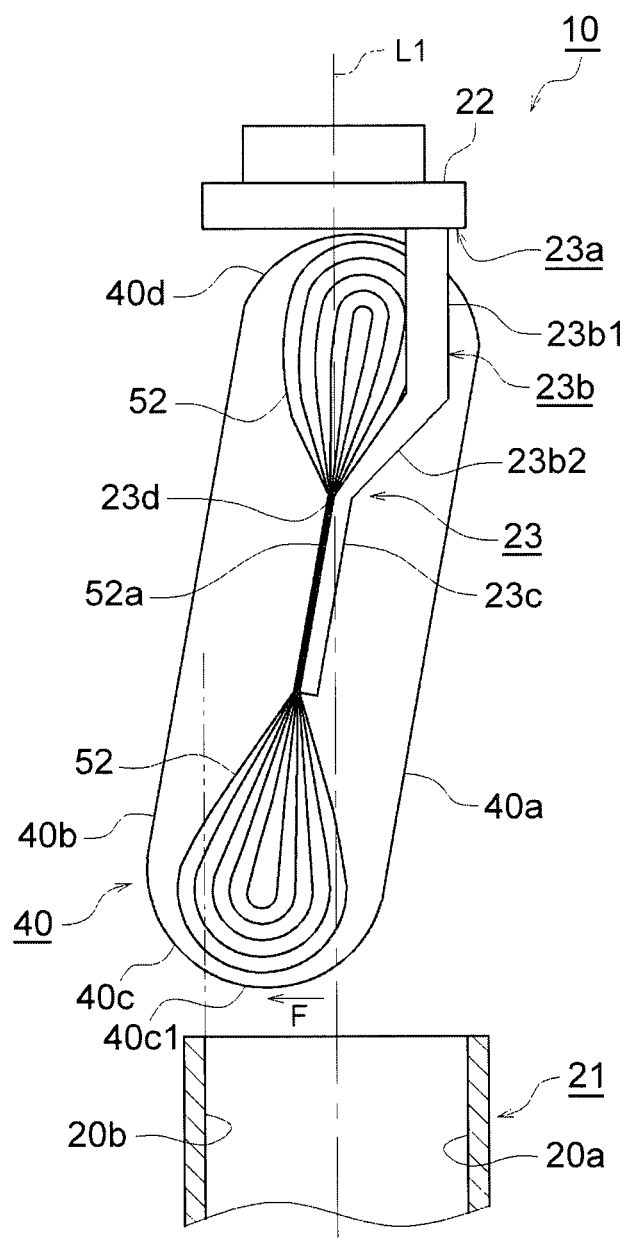
FIG. 5 is a side view illustrating an assembly in which a sealing plate 22, terminals 23, 24, and the electrode body 40 are assembled.

FIG. 5 is a side view illustrating an assembly in which the sealing plate 22, the terminals 23, 24, and the electrode body 40 are assembled. Herein, the electrode body 40 attached to the tip ends 23c, 24c of the terminals 23, 24 is inclined relative to the center line L1 of the side surface of the battery outer case 20 in the width direction in a natural state. Here, an inclination amount of the electrode body 40 is adjusted such that the assembly in which the sealing plate 22, the terminals 23, 24, and the electrode body 40 are assembled is taken out from the case main body 21, and a normal line of the sealing plate 22 at a center of the sealing plate 22 in the width direction and a central axis of the case main body 21 in the width direction are set along the straight line L1, as illustrated in FIG. 5. In this case, a top 40c1 of that R part 40c (a lower R part) of the electrode body 40 which is placed on a side far from the sealing plate 22 for the electrode body 40 may be placed on an inner side relative to an inner surface 20b (an inner surface of a back-face side) of the case main body 21 for the electrode body 40. An alternate long and two short dashes line in FIG. 5 indicates a virtual line extended from the inner surface 20b (the inner surface of the back-face side) of the case main body 21 for the electrode body 40. The top 40c1 of that R part 40c (the lower R part) of the electrode body 40 which is placed on the side far from the sealing plate 22 of the electrode body 40 may be placed on an inner side (an inner side of the case) relative to the virtual line. This makes it possible to easily assemble, to the case main body 21, the assembly in which the sealing plate 22, the terminals 23, 24, and the electrode body 40 are assembled. Further, in the present embodiment, when the assembly in which the sealing plate 22, the terminals 23, 24, and the electrode body 40 are assembled is taken out from the case main body 21, that side of the electrode body 40 which is far from the sealing plate 22 is inclined relative to the normal line direction (L1) of the sealing plate 22, toward an opposite side (the direction of the arrow F) to the side on which the tip ends of the terminals 23, 24 are joined as illustrated in FIG. 5.

As described above, when such an assembly is assembled to the case main body 21, the electrode body 40 receives a force from the surface 20a of the battery outer case 20 as illustrated in FIG. 3. Further, the tip ends 23c, 24c of the terminals 23, 24 receive the force F2 from the intermediate parts 52a, 62a of the electrode body 40. Hereby, the tip ends 23c, 24c of the terminals 23, 24 are pushed by the intermediate parts 52a, 62a of the electrode body 40. Accordingly, the tip ends 23c, 24c and the intermediate parts 52a, 62a are maintained at a position where the force F2 of the intermediate parts 52a, 62a to push the tip ends 23c, 24c is balanced with the force F1 of the tip ends 23c, 24c to push the intermediate parts 52a, 62a. In this case, as described above, the forces F1, F2 work to cause the tip ends 23c, 24c to make close contact with the intermediate part 52a, 62a. On that account, the joining portions between the terminals 23, 24 and the electrode body 40 are highly reliable.

Further, in such a configuration, in a state where an outer surface of the battery outer case 20 is not constrained (in other words, in a state where deformation of the outer surface of the battery outer case 20 is not restricted), the surface 40b of the wound electrode body 40 is pushed against the battery outer case 20 more strongly than the surface 40a of the wound electrode body 40. That is, that surface 40b of the wound electrode body 40 which is an opposite side to the side where the tip ends 23c, 24c of the terminals 23, 24 are joined is pushed against the battery outer case 20 more strongly than that surface 40a of the wound electrode body 40 which is on the side where the tip ends 23c, 24c of the terminals 23, 24 are joined. From another viewpoint, that surface 40b on the opposite side to the side where the tip ends 23c, 24c of the terminals 23, 24 are joined is pushed strongly against the surface 20b of the battery outer case 20. Because of this, the surface 20b of the battery outer case 20 receives an internal pressure higher than that of the surface 20a on an opposite side to the surface 20b. Note that, in a case where the outer surface of the battery outer case 20 is restricted, a force of a restriction member to be pushed against the outer surface of the battery outer case 20 is balanced with forces received by the surfaces 20a, 20b of the battery outer case 20, from inside. Therefore, it is considered that no difference occurs between the forces received by the surfaces 20a, 20b of the battery outer case 20 from inside.

In the present embodiment, the boundaries 23d, 24d between the second linear parts 23b2, 24b2 and the tip ends 23c, 24c have respective base points at which the tip ends 23c, 24c are bent elastically relative to the second linear parts 23b2, 24b2. Herein, the second linear parts 23b2, 24b2 are gradually reduced in plate thickness from the tips of the first linear parts 23b1, 24b1 toward the tip ends 23c, 24c. Hereby, as illustrated in FIG. 3, in a case where the tip ends 23c, 24c receive the reaction force F2 to be pushed, the tip ends 23c, 24c are elastically bent at the boundaries 23d, 24d between the second linear parts 23b2, 24b2 and the tip ends 23c, 24c, as the base points. As such, the boundaries 23d, 24d between the second linear parts 23b2, 24b2 and the tip ends 23c, 24c have the base points at which the tip ends 23c, 24c are bent elastically relative to the second linear parts 23b2, 24b2. On this account, deformations, due to the reaction force F2, of the second linear parts 23b2, 24b2 and the first linear parts 23b1, 24b1 of the terminals 23, 24 are absorbed. This reduces a force caused due to the reaction force F2 and working on the joining portions of the base ends 23a, 24a of the terminals 23, 24 to the sealing plate 22, so that the joining portions are protected.

Figure 6:
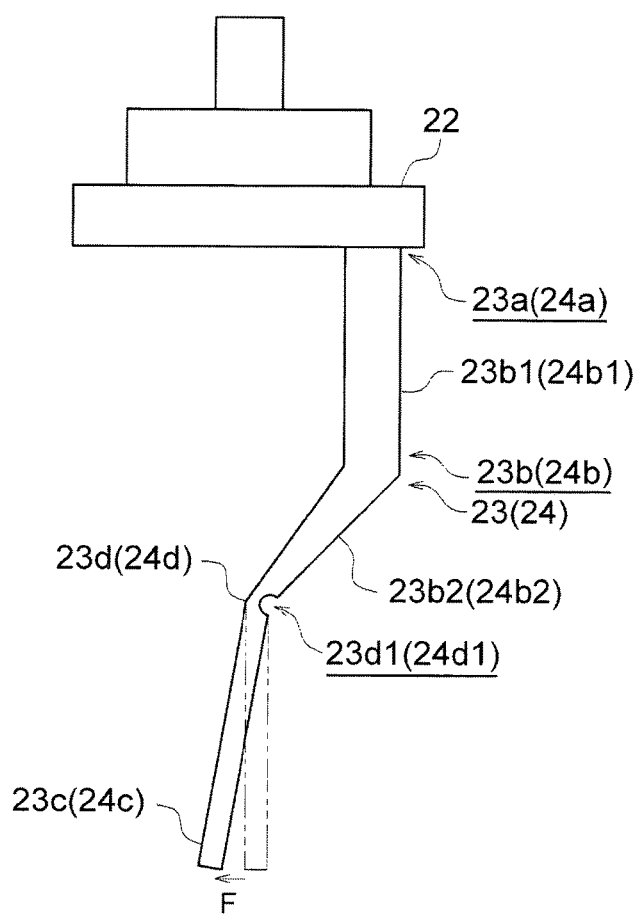
FIG. 6 is a side view illustrating a modification of the terminals 23, 24.

FIG. 6 is a side view illustrating a modification of the terminals 23, 24. As a structure to bend the tip ends 23c, 24c at the boundaries 23d, 24d between the second linear parts 23b2, 24b2 and the tip ends 23c, 24c as the base points, the boundaries 23d, 24d may have a thickness thinner than the other parts of the second linear parts 23b2, 24b2 and the tip ends 23c, 24c, as illustrated in FIG. 6. In an example illustrated in FIG. 6, grooves 23d1, 24d1 are provided on a surface opposite to a side where the electrode body 40 is attached to the tip ends 23c, 24c. As a result, the thickness of the boundaries 23d, 24d is thinner than the other parts. The structure is not limited to this, and grooves may be provided on a surface on the side where the electrode body 40 is attached to the tip ends 23c, 24c of the terminals 23, 24, although not illustrated herein. Further, grooves may be provided on both surfaces of the terminals 23, 24 at the boundaries 23d, 24d. Even in these cases, the thickness of the boundaries 23d, 24d can be made thinner than the other parts. Then, as illustrated in FIG. 3, in a case where the tip ends 23c, 24c receive the reaction force F2 to be pushed, the tip ends 23c, 24c are bent at the boundaries 23d, 24d as the base points, so that deformations caused in the terminals 23, 24 due to the reaction force F2 are absorbed. Hereby, the joining portions of the base ends 23a, 24a of the terminals 23, 24 to the sealing plate 22 are protected.

Besides, in the present embodiment, the base ends 23a, 24a of the terminals 23, 24 are attached to the sealing plate 22. The attaching positions of the sealing plate are biased toward the side where the tip ends 23c, 24c of the terminals 23, 24 are attached to the electrode body 40. The first linear parts 23b1, 24b1 extend from the base ends 23a, 24a along the surface on the one side of the battery outer case 20. Because of this, deformations due to the reaction force F2 are hard to occur in the base ends 23a, 24a of the terminals 23, 24. Further, the base ends 23a, 24a and the first linear parts 23b1, 24b1 of the terminals 23, 24 may have rigidity higher than that of the tip ends 23c, 24c of the terminals 23, 24. In the present embodiment, the thicknesses of the base ends 23a, 24a and the first linear parts 23b1, 24b1 of the terminals 23, 24 are thicker than that of the tip ends 23c, 24c of the terminals 23, 24. As such, rigidities of the base ends 23a, 24a and the first linear parts 23b1, 24b1 of the terminals 23, 24 are higher than that of the tip ends 23c, 24c of the terminals 23, 24. Because of this, deformations due to the reaction force F2 are hard to occur in the base ends 23a, 24a of the terminals 23, 24, so that the reliability of the joining portions between the base ends 23a, 24a of the terminals 23, 24 and the sealing plate 22 is increased.

Further, in the present embodiment, the intermediate parts where edges of the wound sheets are united are provided on both sides of the electrode body 40 in the direction of the winding shaft WL, as illustrated in FIG. 1. The terminals 23, 24 are attached to the electrode body 40 on the same side (on a surface-40a side). In this case, when the assembly in which the sealing plate 22, the terminals 23, 24, and the electrode body 40 are assembled is taken out from the case main body 21, that side of the electrode body 40 which is far from the sealing plate 22 is inclined relative to a normal line direction (L1) of the sealing plate 22, toward an opposite side (the direction of the arrow F) to the side where the tip ends of the terminals 23, 24 are joined, as illustrated in FIG. 5. That is, the electrode body 40 is inclined toward one side relative to the case main body 21. Here, in the battery 10 proposed herein, the tip ends 23c, 24c of the terminals 23, 24 may be joined to surfaces on one sides of the intermediate parts 52a, 62a of the electrode body 40, so as to push the intermediate parts 52a, 62a of the electrode body 40 inside the battery outer case 20. This configuration is not limited to the above embodiment.

Figure 7:
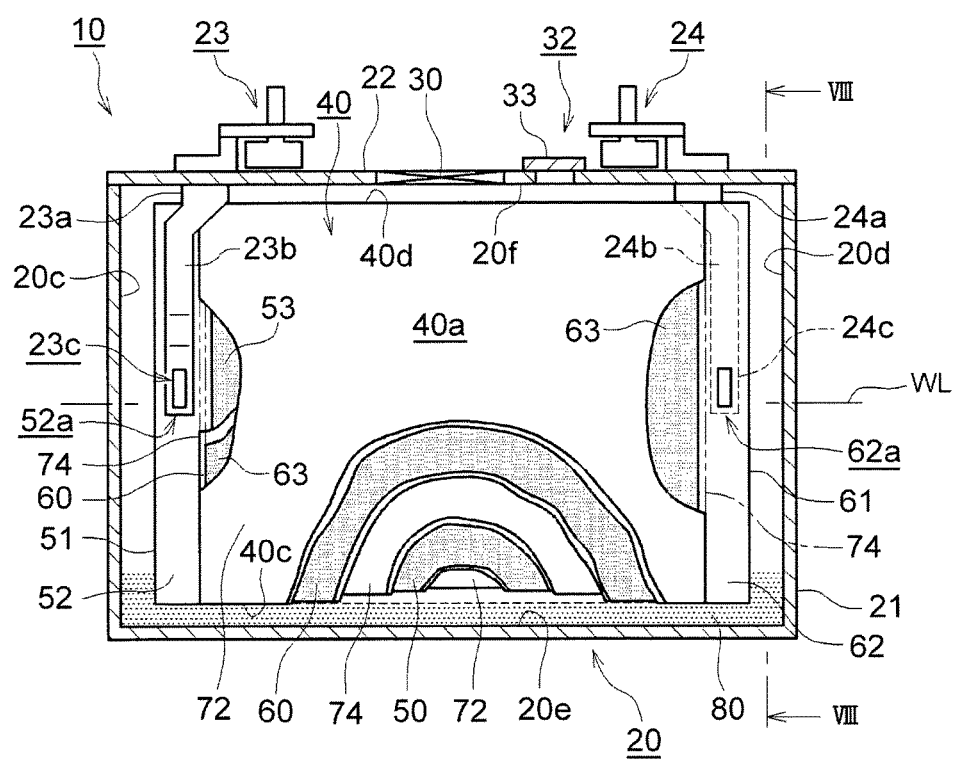
FIG. 7 is a sectional view illustrating a battery according to another embodiment.
Figure 8:
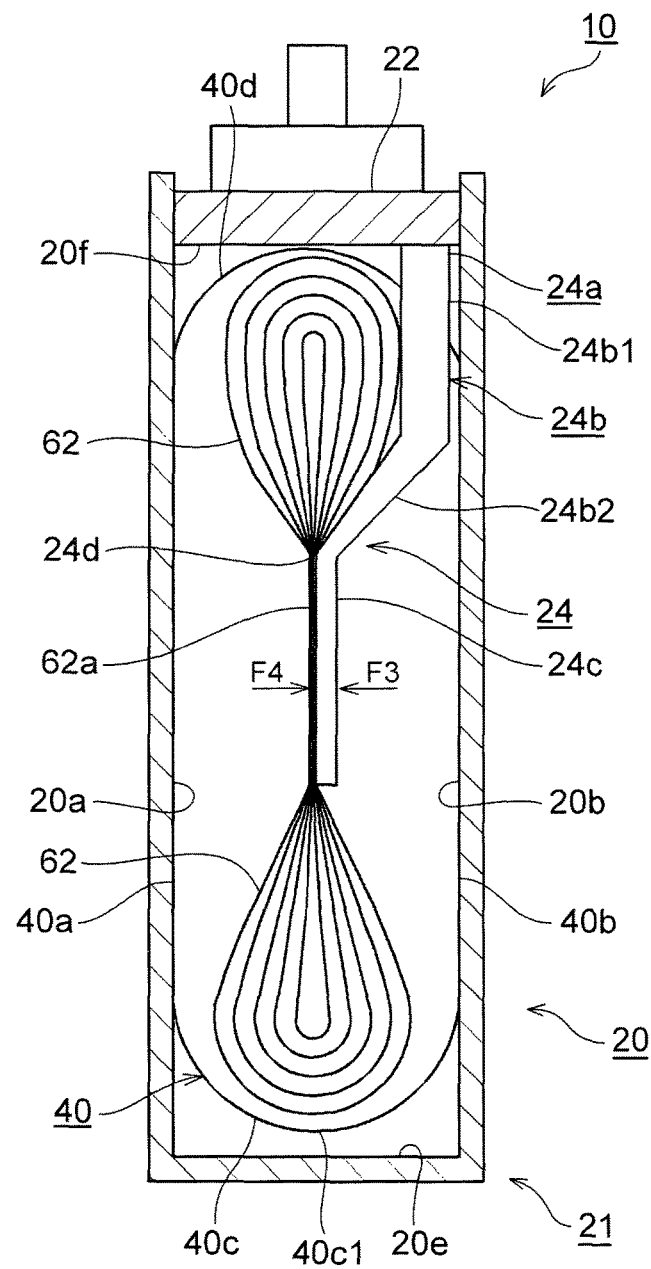
FIG. 8 is a sectional view illustrating a side surface on an exposed-part-62 side of a negative electrode in the battery according to the another embodiment.

For example, FIG. 7 is a view illustrating a battery according to another embodiment. As illustrated in FIG. 7, terminals 23, 24 may be attached to opposite sides of an electrode body 40. In an example illustrated in FIG. 7, the terminal 23 is attached to a surface-40a side of the electrode body 40. The terminal 24 is attached to a surface-40b side of the electrode body 40. In this case, FIG. 8 is a sectional view illustrating a side surface on an exposed-part-62 side of a negative electrode according to the battery of the another embodiment. In this case, an exposed part 52 on a positive-electrode side of the electrode body 40 is pushed by the terminal 23 from a front face (40a) side toward a back surface (40b) side as illustrated in FIG. 3. In contrast, an exposed part 62 on a negative-electrode side of the electrode body 40 is pushed by the terminal 24 from the back surface (40b) side toward the front face (40a) side as illustrated in FIG. 8.

Figure 9:
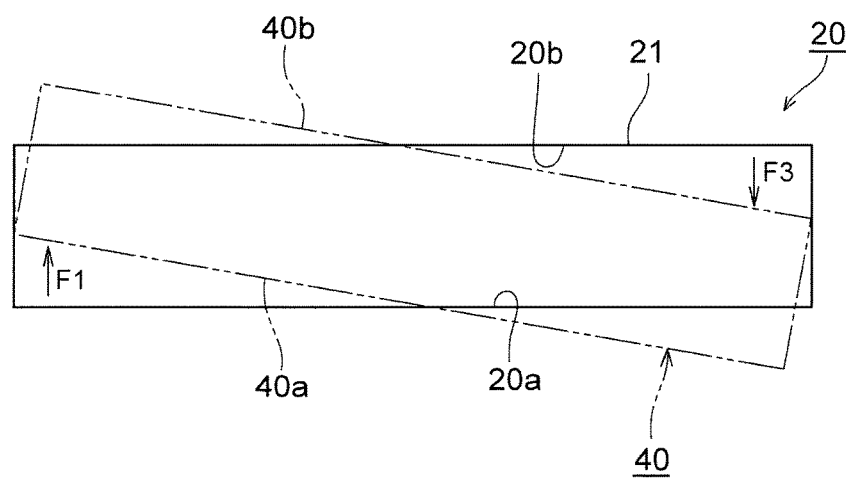
FIG. 9 is a schematic view illustrating a state of the battery of the another embodiment at the time when the assembly is taken out from a case main body 21 (or before the assembly is assembled to the case main body 21).

Here, the terminal 24 pushes an intermediate part 62a of the electrode body 40 with a pushing force F3, and the intermediate part 62a of the electrode body 40 applies a reaction force F4 on the terminal 24, so that the force F3 is balanced with the reaction force F4. FIG. 9 is a schematic view illustrating a state of the battery of the another embodiment at the time when an assembly in which a sealing plate 22, the terminals 23, 24, and the electrode body 40 are assembled is taken out from a case main body 21 (or before the assembly is assembled to the case main body 21).

In this state, the electrode body 40 is rotated relative to the case main body 21 in a plan view, as illustrated in FIG. 9. Even in this case, in a state where the electrode body 40 is accommodated in the case main body 21, tip ends 23c, 24c of the terminals 23, 24 are joined to surfaces on respective sides of the intermediate parts 52a, 62a of the electrode body 40, so as to push the intermediate parts 52a, 62a of the electrode body 40, as illustrated in FIGS. 3 and 8. Then, forces (F1, F2) (F3, F4) work to cause the tip ends 23c, 24c to make close contact with the intermediate part 52a, 62a. Because of this, at the time when the battery is provided in an automobile, for example, the battery receives running vibration. Even if the battery receives such vibration, the tip ends 23c, 24c are maintained to make close contact with the intermediate part 52a, 62a due to the forces F1, F2. Accordingly, the tip ends 23c, 24c are hard to be removed from the intermediate parts 52a, 62a, so that joining portions between the terminals 23, 24 and the electrode body 40 are highly reliable.

The above description deals with a case where the electrode body 40 is the wound electrode body 40, but the electrode body 40 is not limited to the wound electrode body 40. Although not illustrated herein, the electrode body 40 may be a laminated electrode body in which positive-electrode sheets and negative-electrode sheets are laminated alternately via separators.

The following generally describes a proposed battery including the laminated electrode body. Note that, for reference, the same reference sign is assigned to a member or part corresponding to a member or part in the above embodiment, appropriately. Further, the following description uses FIGS. 1 to 9 as reference drawings, appropriately.

A battery 10 proposed herein includes a battery outer case 20, an electrode body 40, and terminals 23, 24. The battery outer case 20 includes: a bottomed case main body 21 which has a flat accommodation space and of which one surface is opened; and a sealing plate 22 attached to that one surface of the case main body 21 which is opened. The electrode body 40 is a flat electrode body, and is accommodated in the flat accommodation space of the battery outer case 20. Further, the electrode body 40 includes parts (the intermediate parts 52a, 62a of the exposed parts 52, 62 in the above embodiment) to which the terminals 23, 24 are joined. Further, the terminals 23, 24 include base ends 23a, 24a, intermediate parts 23b, 24b, and tip ends 23c, 24c. The base ends 23a, 24a are attached to the sealing plate 22. The intermediate parts 23b, 24b extend from the base ends 23a, 24a toward parts 52a, 62a to which the terminals 23, 24 are joined, along a surface on one side of the battery outer case 20. The tip ends 23c, 24c are joined to the parts 52a, 62a to which the terminals 23, 24 are joined. Here, the tip ends 23c, 24c of the terminals 23, 24 are joined to surfaces on one sides of the parts 52a, 62a to which the terminals 23, 24 are joined, so as to push the parts to which the terminals 23, 24 are joined. In this case, inside the case main body 21, joining portions between the electrode body 40 and the terminals 23, 24 are pushed by the tip ends 23c, 24c of the terminals 23, 24. Further, forces F1, F2 are applied to the joining portions between the terminals 23, 24 and the electrode body 40, so that the terminals 23, 24 make close contact with the electrode body 40. On that account, the joining portions between the terminals 23, 24 and the electrode body 40 are highly reliable.

Further, the tip ends 23c, 24c of the terminals 23, 24 may be joined to the surfaces on one sides of the parts 52a, 62a to which the terminals 23, 24 are joined. In this case, in a state where an outer surface of the battery outer case 20 is not restricted, that surface of the electrode body 40 which is on an opposite side to a side where the tip ends 23c, 24c of the terminals 23, 24 are joined may be pushed against the battery outer case 20 more strongly than that surface of the electrode body 40 which is on the side where the tip ends 23c, 24c of the terminals 23, 24 are joined. Even in this case, inside the case main body 21, those parts of the electrode body 40 to which the terminals 23, 24 are joined are pushed by the tip ends 23c, 24c of the terminals 23, 24. Further, forces are applied to the joining portions between the terminals 23, 24 and the electrode body 40, so that the terminals 23, 24 make close contact with the electrode body 40. On that account, the joining portions between the terminals 23, 24 and the electrode body 40 are highly reliable.

Further, a manufacturing method of the battery proposed herein includes, for example: a step of preparing terminals 23, 24; a step of preparing a flat electrode body 40; a step of preparing a case main body 21 which has a flat rectangular-solid-shaped accommodation space and of which one surface is opened; a step of preparing a sealing plate 22 to be attached to an opening of the case main body 21; a step of attaching the terminals 23, 24 to the sealing plate 22; a step of joining the terminals 23, 24 to the electrode body 40; and a step of placing, in the case main body 21, the electrode body 40 out of an assembly including the sealing plate 22, the terminals 23, 24, and the electrode body 40, and mounting the sealing plate 22 to the opening of the case main body 21.

Here, the terminals 23, 24 prepared herein includes: base ends 23a, 24a to be attached to the sealing plate 22; intermediate parts 23b, 24b extending from the base ends 23a, 24a; and flat tip ends 23c, 24c bent from tips of the intermediate parts 23b, 24b. Further, the tip ends 23c, 24c are inclined relative to a normal line L1 of an inner surface 20f of the sealing plate 22 (see FIG. 4) so that, at the time when the terminals 23, 24 are attached to the sealing plate 22, a normal line L2 of either one surfaces of the tip ends 23c, 24c intersects with a flat surface L3 along the inner surface 20f of the sealing plate 22 in a natural state.

Further, in the step of joining the terminals 23, 24 to the electrode body 40, the electrode body 40 is joined to those one surfaces of the tip ends 23c, 24c of the terminals 23, 24 of which the normal line L2 intersects with the flat surface L3 along the inner surface 20f of the sealing plate 22 (see FIG. 5). Further, in the step of placing the electrode body 40 in the case main body 21 and mounting the sealing plate 22 to the opening of the case main body 21, the terminals 23, 24 are deformed at boundaries 23d, 24d between the intermediate parts 23b, 24b and the tip ends 23c, 24c as base points (see FIG. 3).

The battery embodied by the manufacturing method of such an electrode is in a state where those parts of the electrode body 40 to which the terminals 23, 24 are joined are pushed by the tip ends 23c, 24c of the terminals 23, 24 inside the case main body 21. Further, forces F1, F2 are applied to the joining portions between the terminals 23, 24 and the electrode body 40, so that the terminals 23, 24 make close contact with the electrode body 40 (see FIG. 3). This makes it possible to obtain a battery with highly reliable joining portions between the terminals 23, 24 and the electrode body 40.

In terms of the terminals 23, 24 prepared herein, an inclination angle of flat surfaces of the tip ends 23c, 24c relative to the normal line L1 of the inner surface 20f of the sealing plate 22 may be 1 degree or more, preferably 2 degrees or more, further preferably 3 degrees or more, for example. This causes such a state where those parts of the electrode body 40 to which the terminals 23, 24 are joined are clearly pushed by the tip ends 23c, 24c of the terminals 23, 24. Further, when the angle is too large, the electrode body 40 is hard to be inserted into the case main body 21. In view of this, the angle may be less than 20 degrees, preferably less than 15 degrees, more preferably less than 10 degrees, for example.

The battery proposed herein has been described above, but the battery proposed herein is not limited to the above embodiment, and can be applied to various batteries, for example. Further, as described above, the battery proposed herein is configured such that the joining portions between the terminals and the electrode body are highly reliable. Because of this, the battery is usable preferably for such a purpose that the battery is provided in a vehicle and receives running vibration. Such a purpose includes a power source (driving power supply) for a motor to be provided in a vehicle, for example. The type of the vehicle is not limited in particular, but may be, for example, a plug-in hybrid vehicle (PHV), a hybrid vehicle (HV), an electric vehicle (EV), an electric truck, a motorized bicycle, an electric assist bicycle, a powered wheelchair, an electric railway, and the like. Note that the battery may be used in a form of a battery pack configured such that a plurality of batteries is connected in series and/or in parallel to each other.

The invention claimed is:

1. A battery comprising:
    a battery outer case;
    an electrode body; and
    a terminal, wherein:
    the battery outer case includes a bottomed case main body which has a flat accommodation space and of which one surface is opened, and a sealing plate attached to that one surface of the case main body which is opened;
    the electrode body is a flat electrode body, is accommodated in the flat accommodation space of the case main body, and has a part to which the terminal is joined;
    the terminal includes a base end attached to the sealing plate, an intermediate part extending from the base end toward the part to which the terminal is joined, along a surface on one side of the battery outer case, and a tip end joined to the part to which the terminal is joined;
    the tip end of the terminal is joined to a surface on one side of the part to which the terminal is joined; and
    in a state where an outer surface of the battery outer case is not constrained, that surface of the electrode body which is on an opposite side to a side where the tip end of the terminal is joined is pushed against the battery outer case more strongly than that surface of the electrode body which is on the side where the tip end of the terminal is joined.

2. The battery according to claim 1, wherein:
    the base end of the terminal is attached to the sealing plate, an attaching portion of the sealing plate being biased toward the side where the tip end of the terminal is joined;
    the intermediate part of the terminal has a first linear part extending along the surface on the one side of the battery outer case, and a second linear part bent from a tip of the first linear part; and
    the tip end of the terminal is bent from a tip of the second linear part, and has a flat shape having a thinner plate-thickness than that of the first linear part, and in a natural state where the electrode body is removed from the terminal, the tip end is inclined toward a side where the electrode body is attached.

3. The battery according to claim 2, wherein
    a boundary between the second linear part and the tip end has a base point at which the tip end is elastically bent relative to the second linear part.

4. The battery according to claim 3, wherein the second linear part is gradually reduced in plate thickness from the tip of the first linear part toward the tip end.

5. The battery according to claim 3, wherein a thickness of the boundary between the second linear part and the tip end is thinner than the other parts of the second linear part and the tip end.

6. The battery according to claim 2, wherein the base end and the first linear part of the terminal have rigidity higher than that of the tip end of the terminal.

7. The battery according to claim 1, wherein when an assembly in which the sealing plate, the terminal, and the electrode body are assembled is taken out from the case main body, that side of the electrode body which is far from the sealing plate is inclined relative to a normal line direction of the sealing plate, toward an opposite side to the side where the tip end of the terminal is joined.

8. A battery manufacturing method comprising:
preparing a terminal;
preparing a flat electrode body;
preparing a case main body which has a flat rectangular-solid-shaped accommodation space and of which one surface is opened;
preparing a sealing plate to be attached to an opening of the case main body;
attaching the terminal to the sealing plate;
joining the terminal to the electrode body; and
placing, in the case main body, the electrode body out of an assembly including the sealing plate, the terminal, and the electrode body, and mounting the sealing plate to the opening of the case main body, wherein:
the terminal thus prepared includes a base end to be attached to the sealing plate, an intermediate part extending from the base end, and a flat tip end bent from a tip of the intermediate part, and the tip end is inclined relative to a normal line of an inner surface of the sealing plate such that, at the time when the terminal is attached to the sealing plate, a normal line of either one surface of the tip end intersects with a flat surface along the inner surface of the sealing plate;
in the joining of the terminal to the electrode body, the electrode body is joined to the one surface of the tip end of the terminal; and
in the placing of the electrode body in the case main body and the mounting of the sealing plate to the opening of the case main body, the terminal is deformed at a boundary between the intermediate part and the tip end, as a base point.

* * * * *